United States Patent
Vermette et al.

(10) Patent No.: US 9,405,636 B2
(45) Date of Patent: Aug. 2, 2016

(54) RECOVERING STEP AND BATCH-BASED PROCESSES

(71) Applicant: ORACLE INTERNATIONAL CORPORATION, Redwood Shores, CA (US)

(72) Inventors: Shane Robert Vermette, San Carlos, CO (US); Vijay Manguluru, Fremont, CA (US); Dinakar Hituvalli, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 334 days.

(21) Appl. No.: 13/906,608

(22) Filed: May 31, 2013

(65) Prior Publication Data

US 2014/0359627 A1 Dec. 4, 2014

(51) Int. Cl.
*G06F 9/46* (2006.01)
*G06F 11/14* (2006.01)

(52) U.S. Cl.
CPC ........ *G06F 11/1482* (2013.01); *G06F 11/1474* (2013.01); *G06F 11/1438* (2013.01)

(58) Field of Classification Search
None
See application file for complete search history.

(56) References Cited

U.S. PATENT DOCUMENTS

| | | | |
|---|---|---|---|
| 7,146,350 B2 | 12/2006 | Holland et al. | |
| 7,206,805 B1 * | 4/2007 | McLaughlin, Jr. | 709/203 |
| 7,464,293 B2 | 12/2008 | Goyal et al. | |
| 7,779,298 B2 * | 8/2010 | Challenger et al. | 714/15 |
| 8,286,181 B2 | 10/2012 | Daute | |
| 2005/0066064 A1 * | 3/2005 | Micheal | G06F 9/526 710/1 |
| 2007/0214457 A1 | 9/2007 | Goyal et al. | |
| 2010/0115332 A1 * | 5/2010 | Zheng | G06F 11/1461 714/6.2 |
| 2011/0087637 A1 | 4/2011 | Sundaram et al. | |
| 2011/0295406 A1 | 12/2011 | Horst et al. | |

FOREIGN PATENT DOCUMENTS

EP 880744 5/2004

OTHER PUBLICATIONS

Author Unknown, "Batch message processing: transaction-oriented BMPs", Retrieved from http://publib.boulder.ibm.com/infocenter/dzichelp/v2r2/index.jsp?topic=%2Fcom.ibm.ims11.doc.apg%2Fims_bmpprocessingbatchoriented.htm.

Author Unknown, "Batch Processing and Transactions", Retrieved Dec. 12, 2012, from http://static.springsource.org/spring-batch/transactions.html.

(Continued)

*Primary Examiner* — Kenneth Tang
(74) *Attorney, Agent, or Firm* — Kilpatrick Townsend & Stockton LLP

(57) ABSTRACT

A method of recovering batch-based processes may include providing an interface for receiving processes recoverability information. The recoverability information may include (i) information describing a mutual exclusivity of data affected by a process, (ii) information describing sub-processes associated with the process, and/or (iii) information describing scope cleanup procedures associated with the process. The method may also include receiving the recoverability information through the interface, and receiving an indication that the process experienced an error while being executed on a client system. The method may additionally include providing the process recoverability information to make a recoverability determination for the process.

17 Claims, 9 Drawing Sheets

(56) References Cited

OTHER PUBLICATIONS

Graham, R. L. et al., "On Variations of Petersons Mutual Exclusion Algorithm", pp. 1-4, Retrieved from http://www.cs.cornell.edu/courses/cs5860/2011fa/documents/Graham-OnVariationsOfPetersonsAlgorithm-Aug30.pdf.

Ruyan, F. et al., "Online scheduling in a parallel batch processing system to minimize makespan using restarts", Theoretical Computer Science, vol. 374, Issue 1-3, Apr. 2007, pp. 196-202, Abstract only, Retrieved from http://dl.acm.org/citation.cfm?id=1232958.1233193&coll=DL&dl=GUIDE&CFID=155696246&CFTOKEN=57080778.

Yamatidou, E. C., "Optimal Failure Recovery in Batch Processing Using Petri Net Models", American Control Conference, Jun. 24-26, 1992, p. 1906-1910, Abstract Only, Retrieved from http://ieeexplore.ieee.org/xpl/articleDetails.jsp;jsessionid=nZS1QjvSKGWTh2QFfGdlMc75Tl18X51r1Nz0f7Pn1T1VKl2LKJyy!-394911398?arnumber=4792448&contentType=Conference+Publications.

\* cited by examiner

RECOVERING STEP AND BATCH-BASED PROCESSES

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

In order to deal with large-scale data management, processes may be designed to automate data entry, data storage, data processing, report generation, and/or the like. Many processes for large organizations may be divided into hundreds or even thousands of sub-processes. Step and Batch-based processes may be very complex and may take many hours to execute completely.

BRIEF SUMMARY

In one embodiment, a method of recovering step and batch-based processes may be presented. The method may include providing an interface for receiving processes recoverability information. In some embodiments, the recoverability information may include information describing a mutual exclusivity of data affected by a process, information describing sub-processes associated with the process, and/or information describing scope cleanup procedures associated with the process. The method may also include receiving the recoverability information through the interface, and receiving an indication that the process experienced an error while being executed on a client system. The method may additionally include providing the process recoverability information to make a recoverability determination for the process.

In some embodiments, the method may further include computing a determination as to whether the processes can be recovered based on the recoverability information, and providing the determination as to whether the process can be recovered to the client system. The method may also include determining whether the process should be deployed for live use based at least in part on the recoverability determination. The method may additionally include determining that the process should be removed from live use based on the recoverability determination.

In some embodiments, the interface may include a plurality of fields to be populated by process designer. The information describing the mutual exclusivity of the data affected by the process may include information associated with exclusive and/or scope-based locks, information associated with determining a current scope of processing, and/or information associated with storing the current scope as a state. The information describing sub-processes associated with the process may include information associated with the recoverability of each sub-process, and/or information associated with the performance of each sub-process. The information describing scope cleanup procedures associated with the process may include information associated with deleting a current stored scope or committing a current scope, and/or information associated with debug information provided to the client system.

In another embodiment, a computer-readable memory may be presented. The computer-readable memory may comprise a sequence of instructions which, when executed by one or more processors, causes the one or more processors to recover batch-based processes. The instructions may cause the processor(s) to provide an interface for receiving processes recoverability information. In some embodiments, the recoverability information may include information describing a mutual exclusivity of data affected by a process, information describing sub-processes associated with the process, and/or information describing scope cleanup procedures associated with the process. The instructions may also cause the processor(s) to receive the recoverability information through the interface, and to receive an indication that the process experienced an error while being executed on a client system. The instructions may additionally cause the processor(s) to provide the process recoverability information to make a recoverability determination for the process.

In yet another embodiment, a system may be presented. The system may include one or more processors and a memory communicatively coupled with and readable by the one or more processors. The memory may comprise a sequence of instructions which, when executed by the one or more processors, cause the one or more processors to recover batch-based processes. The instructions may cause the processor(s) to provide an interface for receiving processes recoverability information. In some embodiments, the recoverability information may include information describing a mutual exclusivity of data affected by a process, information describing sub-processes associated with the process, and/or information describing scope cleanup procedures associated with the process. The instructions may also cause the processor(s) to receive the recoverability information through the interface, and to receive an indication that the process experienced an error while being executed on a client system. The instructions may additionally cause the processor(s) to provide the process recoverability information to make a recoverability determination for the process.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components.

In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
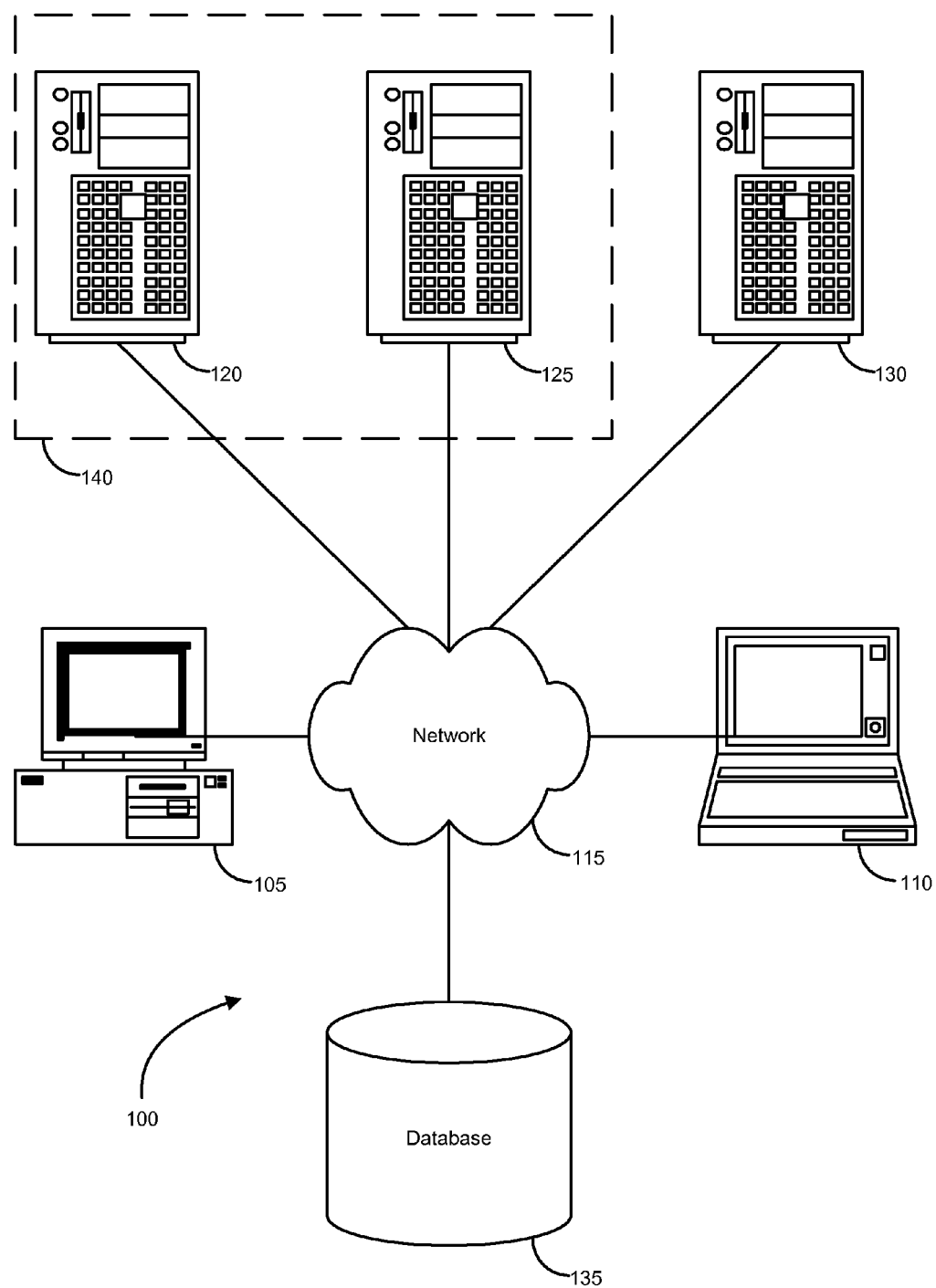
FIG. 1 illustrates a block diagram of components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Each of the embodiments disclosed herein may be implemented in a general-purpose computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
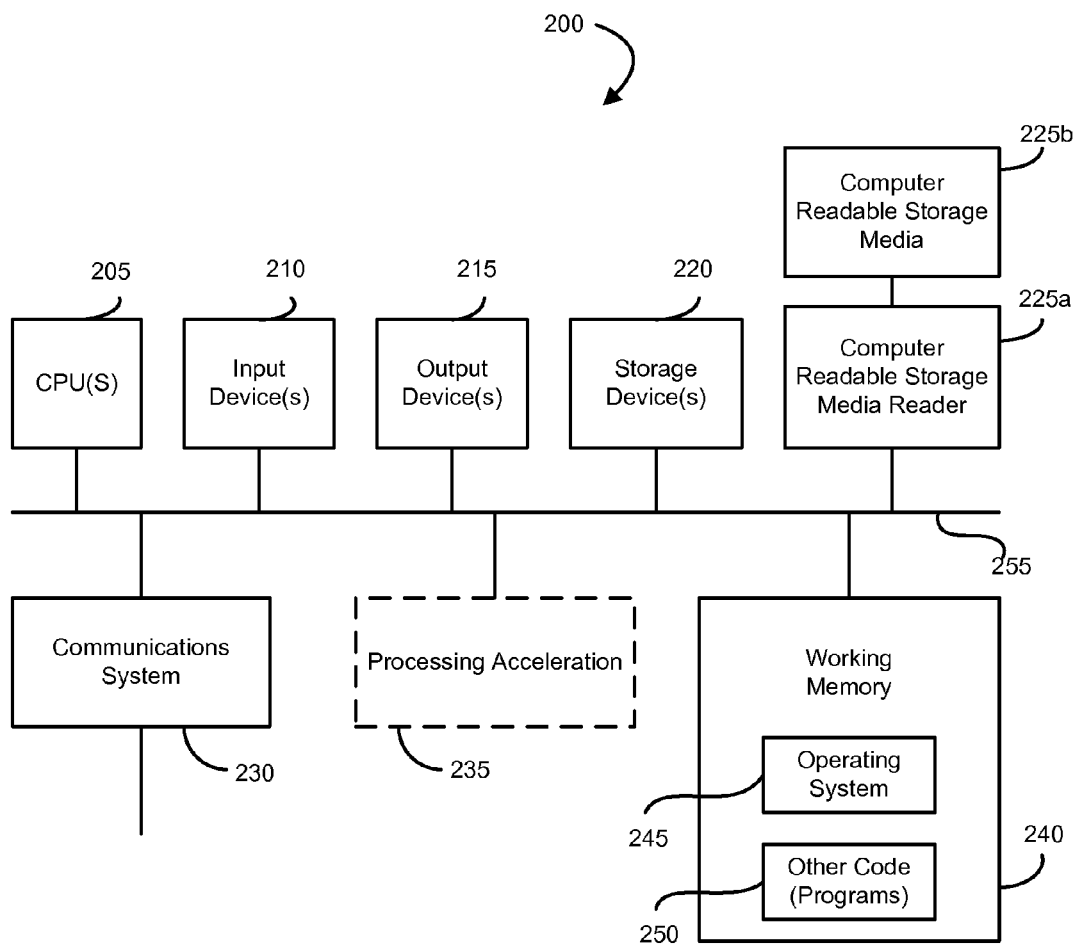
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225*a*, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Each of the methods described herein may be implemented by a computer system, such as computer system 200 in FIG. 2. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Described herein, are embodiments for determining the recoverability of step and batch-based processes. According to some embodiments, an interface is provided whereby process developers can enter recoverability information. Recoverability information may include transactional integrity information, i.e. the ability to save state. The recoverability information may also include sub-process information, as well as scope cleanup procedures associated with the process. The interface may be provided by a process management system and stored in a recoverability repository. The process management system may receive an indication that a process has experienced an error while being executed on a client system. In response, the process management system may provide the recoverability information for use in determining whether the process can be recovered.

As used herein, the term process may describe any multi-step transaction that is carried out on stored data. For example, an Enterprise Software System may use the numerous databases to store, track, analyze, and provide business information to an organization. Updating financial transactions, closing accounts at the end of a financial period, processing pay statements, dispersing overhead costs, and/or the like, may all require multiple database transactions involving hundreds or even thousands of database table entries. In this context, a batch or process may refer to the collection of individual transactions that make up an overall procedure on the database information.

These processes may be distributed to customers to be executed on client devices. Occasionally, an error during the execution of a process may occur, and the client system may attempt to recover from the error. Problems arise in multi-step processes when an error occurs midway through the process. It must then be determined which data have been altered by the process, and which data have not been altered by the process. If a process is recoverable, it can be restarted where the error occurred without violating data integrity rules. On the other hand, if a process is not recoverable, then the process may enter an unexpected state that can require a great deal of time and resources to resolve. Unrecoverable processes also may result in data corruption if the process is simply restarted where the error occurred.

Prior to this disclosure, processing systems did not make determinations after an error occurred as to whether the process was recoverable or not. Instead, some processing systems restore all of the data affected to its state prior to the error. In other words, all of the data produced by the process may be wiped clean, and the process would restart from the beginning. This solution may waste significant processing time and resources, particularly for processes that take multiple hours to complete.

Figure 3:
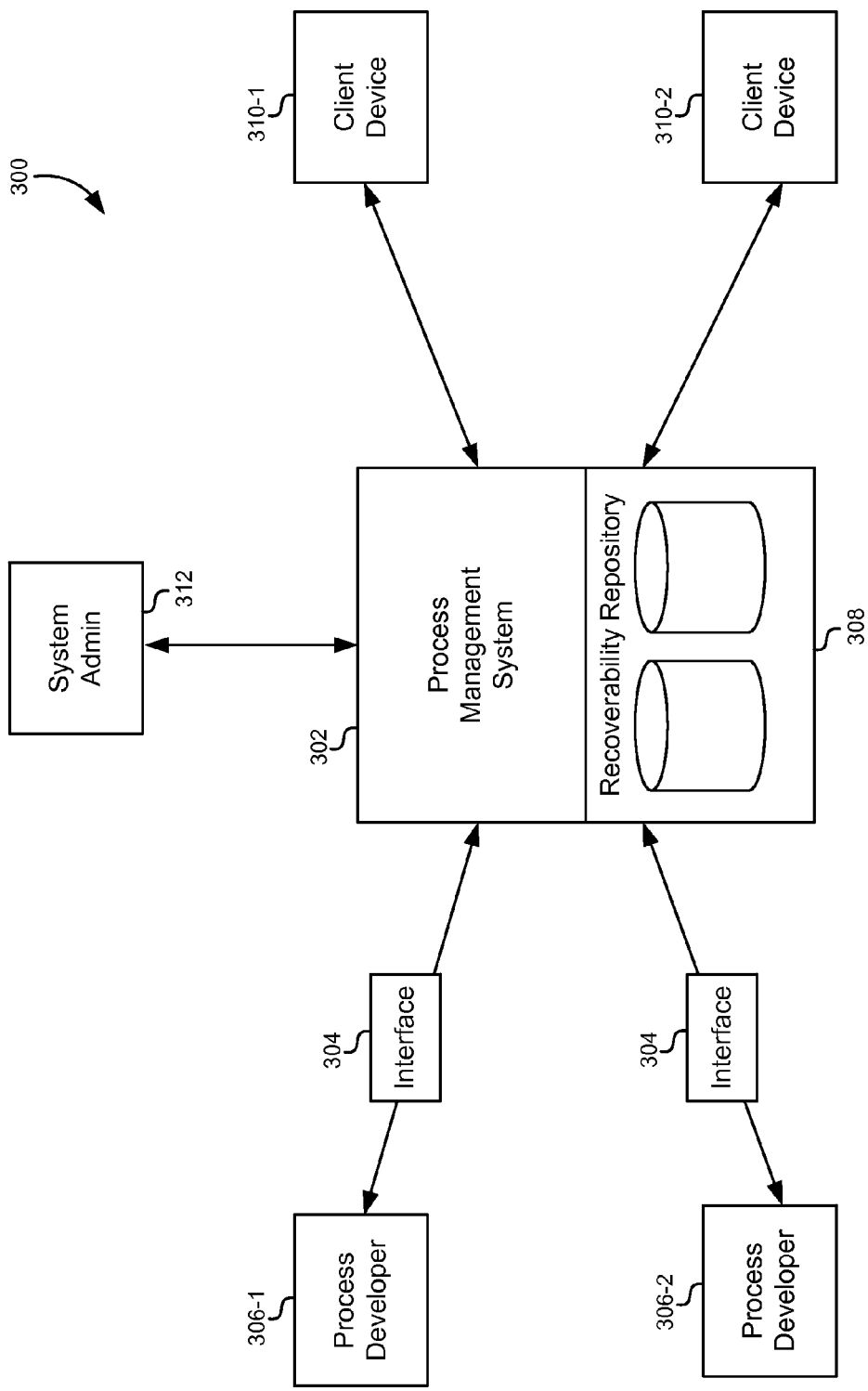
FIG. 3 illustrates a simplified block diagram of a system for determining process recoverability, according to one embodiment.

FIG. 3 illustrates a simplified block diagram 300 of a system for determining process recoverability, according to one embodiment. A process management system 302 may be configured to provide an interface 304 to one or more process developers 306. The interface may be configured to solicit and/or receive recoverability information that is applicable to a wide range of process types. The interface 304 may be provided automatically as a part of a software development process. In some embodiments, a process developer 306 may be required to provide recoverability information to the interface 304 before a process is approved for distribution.

In some embodiments, different portions of the recoverability information may be provided to the interface 304 at different points during the development process. For example, instead of soliciting all of the recoverability information at once, the interface 304 may present incremental solicitations for recoverability information as required by various stages of the development process. For example, sub-process information may be requested when a top-level hierarchy design of a process is completed.

The interface 304 may provide the solicited recovery information to the process management system 302. The process management system 302 may be configured to analyze the recoverability information provided by the interface 304 in order to identify areas of the recoverability information that may indicate that the process may not be recoverable on certain systems. In one embodiment, recoverability information may be compared to acceptable status designations in order to determine whether or not the process is recoverable. In other embodiments, a process developer 306 may be prompted and/or required to provide information for each entry in the interface 304 to identify whether or not the entered information renders the process recoverable or not.

The process management system 302 may also include a recoverability repository 308 that is configured to store recoverability information for a plurality of processes. The recoverability repository 308 may be implemented using any combination of persistent storage devices, such as disk arrays, flash memory, databases, and/or the like. The process management system 302 may store information provided by the interface 304 in the recoverability repository 308, and retrieve such information when making recoverability assessments.

Processes may be distributed and executed on client devices 310. Occasionally during execution, processes may generate error conditions and halt execution midway through a batch of instructions. In some embodiments, the error condition may be transmitted from the particular client device 310 to the process management system 302. The process management system 302 may retrieve the particular recoverability information from the recoverability repository 308 and provide the recoverability information in order to make an assessment as to whether or not the process is recoverable on the particular client device 310.

In some embodiments, the recoverability information may be provided to a system administrator 312 for a manual assessment of the error condition and the possibility of recoverability. In some embodiments, the interface 304 may be presented to a system administrator 312 with the recoverability information populated from the recoverability repository 308. The interface 304 may highlight or otherwise alert the system administrator 312 of portions of the recoverability information that indicate whether it is recoverable. In other embodiments, process management system 302 may automatically retrieve and analyze the recoverability information from the recoverability repository 308 and make a determination as to whether the process is recoverable. Whether the determination is made by the system administrator 312 or by the process management system 302, the determination may be transmitted to the client device 310 such that a local administrator can either flush the effects of the defective process, or recover the process execution where the error occurred.

Some embodiments may use varying levels of automation to determine the recoverability of a process as described above. For example, some embodiments may use a completely automated system that analyzes the process, stores recoverability information, and makes a determination as to whether the process is recoverable without runtime human intervention. Other embodiments may provide recoverability information to human analysts who may make decisions regarding recoverability and how an interrupted process may be recovered.

The methods and systems described herein may be implemented using a general purpose computer system and/or a network computer environment, such as those described in relation to FIG. 1 and FIG. 2. In other embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. Block diagram 300 represents an abstraction of the functions that may be implemented using these types of hardware. After reading this disclosure, one having skill in the art could use these well-known circuit elements to construct the device shown in FIG. 3 to implement these methods and systems. Therefore detailed circuit diagrams have been omitted for brevity.

In one embodiment, the various modules and systems in FIG. 3 may reside on separate hardware devices. Alternatively, multiple modules may be combined on the same or similar hardware devices. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Turning now to a discussion of the particular recoverability information solicited and received by the interface, it has been discovered that certain information may provide an objective mapping to determine recoverability information. This mapping need not depend on specific technologies, but rather on properties that most different technologies share. The recoverability information can be divided into information categories that can be determined by an objective assessment rather than depending on the intuition of individual process developers/owners. Furthermore, by mapping recoverability information into specific categories, the assessment can be completed in a very short time by the owner/developer of each process. Additionally, process developers may be alerted to recoverability problems when providing information to the interface.

Figure 4:
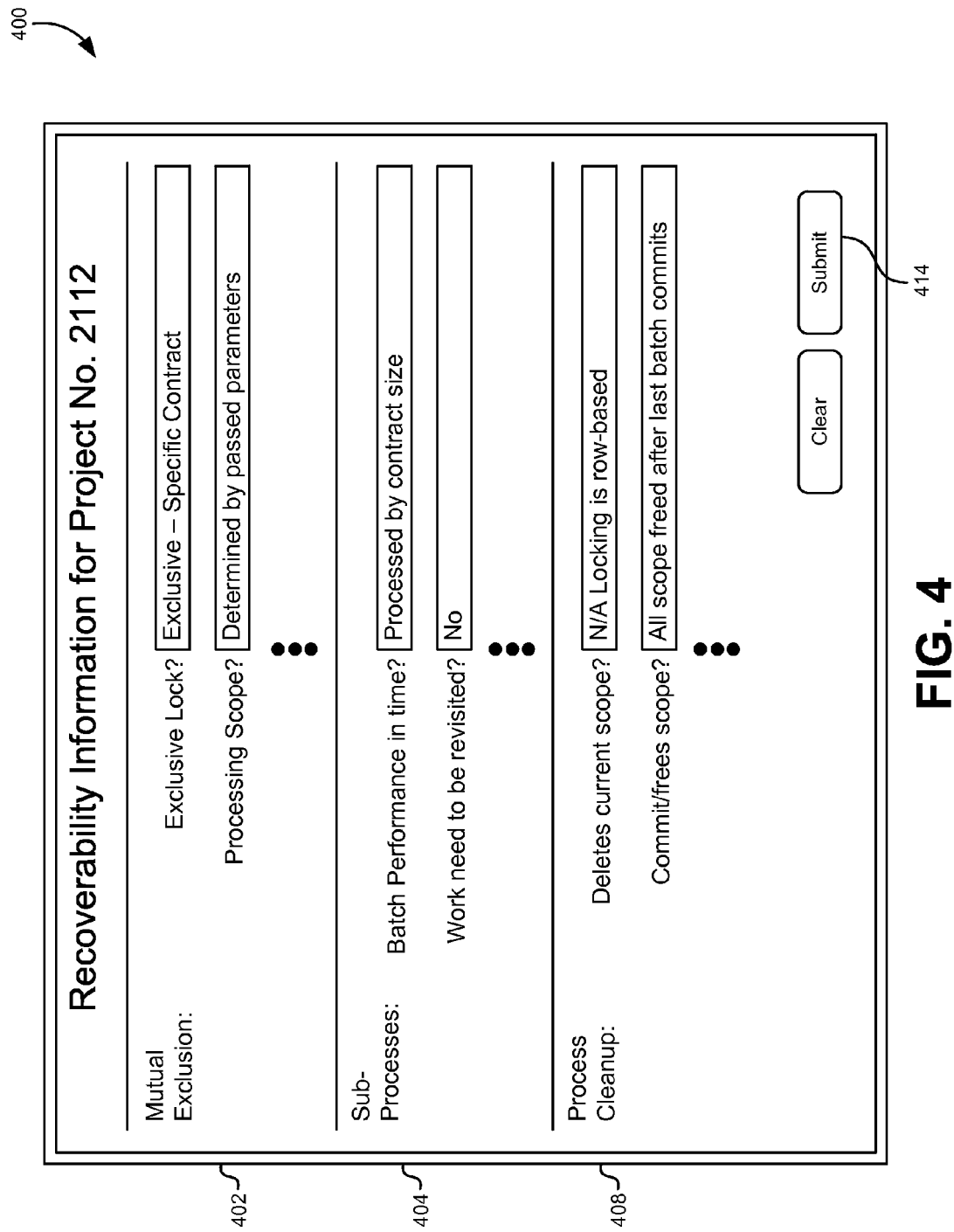
FIG. 4 illustrates an interface for receiving recoverability information, according to one embodiment.

FIG. 4 illustrates an interface 400 for receiving recoverability information, according to one embodiment. The interface 400 may be presented in a web browser or in a standalone application made available to a process developer workstation. In some embodiments, the interface 400 may also be presented by an application operating on a smart phone or tablet computer. The interface 400 may be customized to reference the specific project for which recoverability information is being received. For example, interface 400 may be receiving recoverability information for project number 2112.

In some embodiments, the interface may be spatially divided between the different types of recoverability information available for a particular project. For example, interface 400 is divided between a mutual exclusion area 402, a sub-process area 404, and a process cleanup area 408. All of the recoverability information prompts for each area may be displayed at once in the interface 400. In other embodiments, the interface may present each prompt for information one at a time or in smaller groups depending upon the size of the display. Some embodiments may also limit the amount of information requested based on different stages in the process development cycle. For example, sub-process information may be requested early in the process development cycle, while mutual exclusion information and process cleanup information may be solicited later in the development cycle.

In addition to being displayed as part of a web browser, the interface may also take the form of a spreadsheet that is stored by the recoverability repository and made available to developers. In some cases, the interface may be driven by information queried from relational database tables. The interface may also be presented as a web form with text boxes and other controls.

The information may be provided as a text input from a process developer. Information may also be provided by selecting pre-populated options from a drop-down box or similar form controls. In some cases, the recoverability information may only require a yes/no answer, while other types of information may require more explicit descriptions of how that recoverability issue is being handled by the process developer. In some embodiments, information initially provided by process developer may affect the types of recoverability information solicited later in the interface, and may also affect some of the pre-populated information in the form controls. For example, if a process deals with a relational database that automatically locks rows during transactions and has a row commitment procedure, certain recoverability information related to mutual exclusion and process cleanup may be automatically populated. For example, the process cleanup element that ensures that a current scope is deleted by the process upon exit may be pre-populated with the "N/A locking is row-based" entry.

Figure 5:
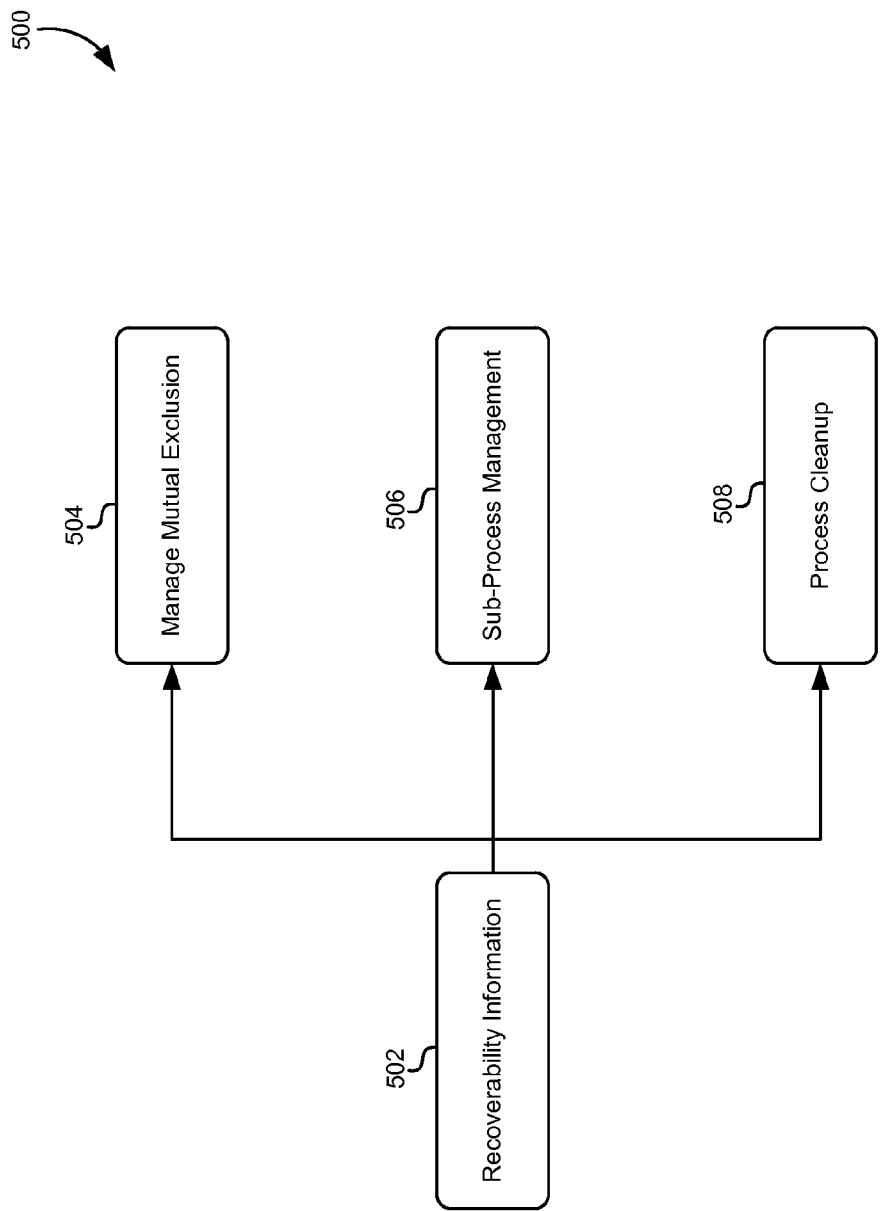
FIG. 5 illustrates a logical flow diagram of the various types of recoverability information that may be solicited by the recoverability interface, according to some embodiments.

FIG. 5 illustrates a logical flow diagram 500 of the various types of recoverability information 502 that may be solicited by the recoverability interface, according to some embodiments. In some embodiments, recoverability information 502 may be subdivided into three different types. The first category of recoverability information 502 may include information describing the mutual exclusivity of data affected by a process (504). One of the basic requirements for recoverability may be described as transactional integrity, i.e. the ability to save state during individual process steps such that all or none of the affected data is altered. Another requirement in the first category of information is exclusive access to data.

A second category of recoverability information 502 may include information associated with sub-process management for sub-processes associated with the process (506). The size and complexity of most processes will often require that they be divided into multiple sub-processes, also referred to herein as steps or batches. Each step/batch may need to meet the same recoverability requirements as the overall process, and this information may be used to recursively dive down into the details of each process to individually assess their recoverability. In some processes, the original process may spawn completely separate threads or sub-processes. In other cases, the original process may simply include a sequence of steps and batches without additional sub-processes being spawned. In some embodiment s, an original process may have both its own steps and batches while also spawning off additional sub-processes. These spawned sub-processes can also themselves have their own steps and batches, as well as additional spawned sub-processes, continued recursively without limit. The embodiments described herein will work in any of these cases.

A third category of recoverability information 502 may include information associated with scope cleanup procedures for any processes or sub-processes (508). Each process or sub-process may use various system resources, such as memory, processing space, database access, interfaces, and/or the like. Ensuring that a process is recoverable may also include ensuring that a failed process does not leave these resources in a locked and unusable condition, or a condition that would interfere with rerunning the process after the failure is detected.

Figure 6:
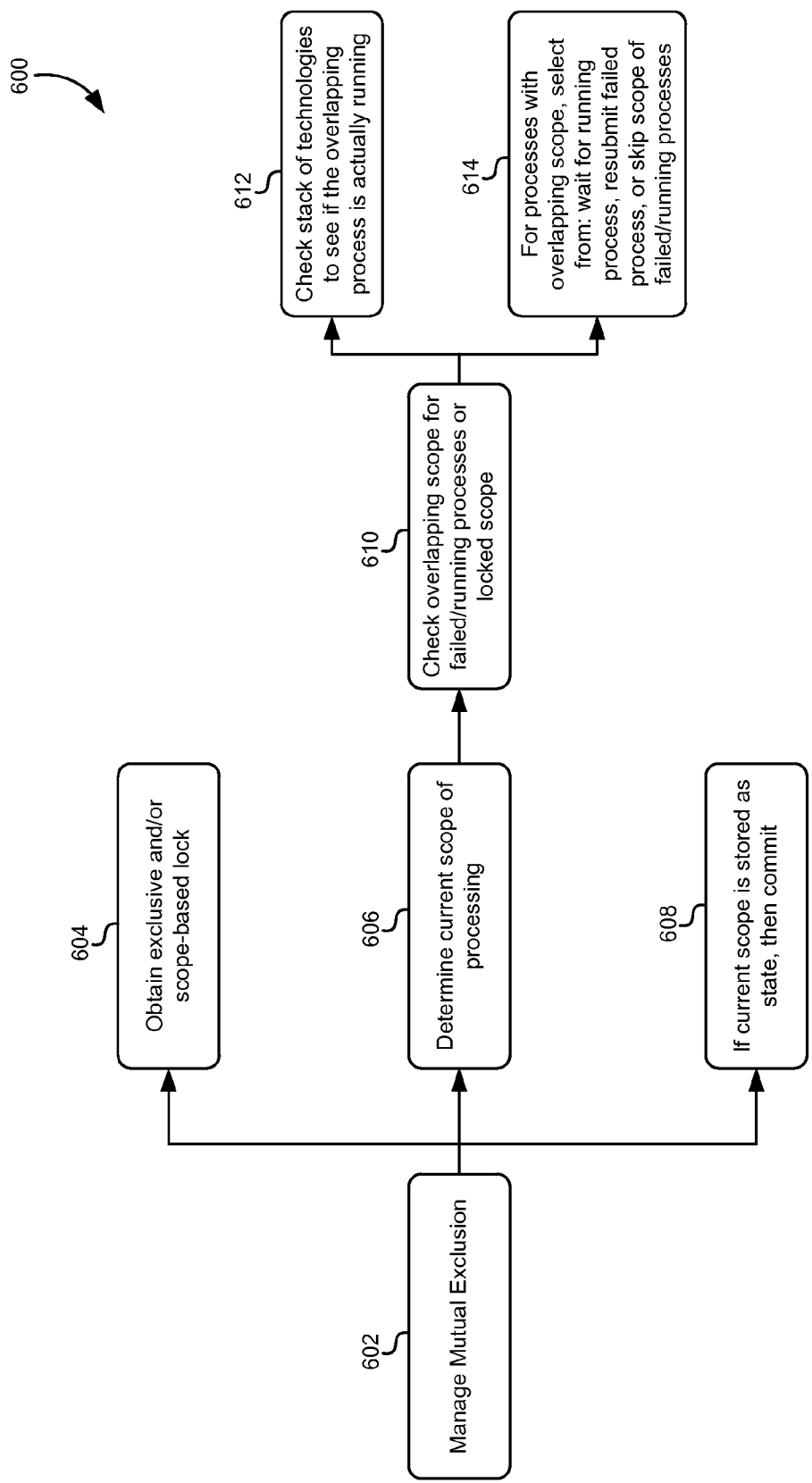
FIG. 6 illustrates a logical flow diagram of recoverability information associated with mutual exclusivity of data affected by a process, according to one embodiment.
Figure 7:
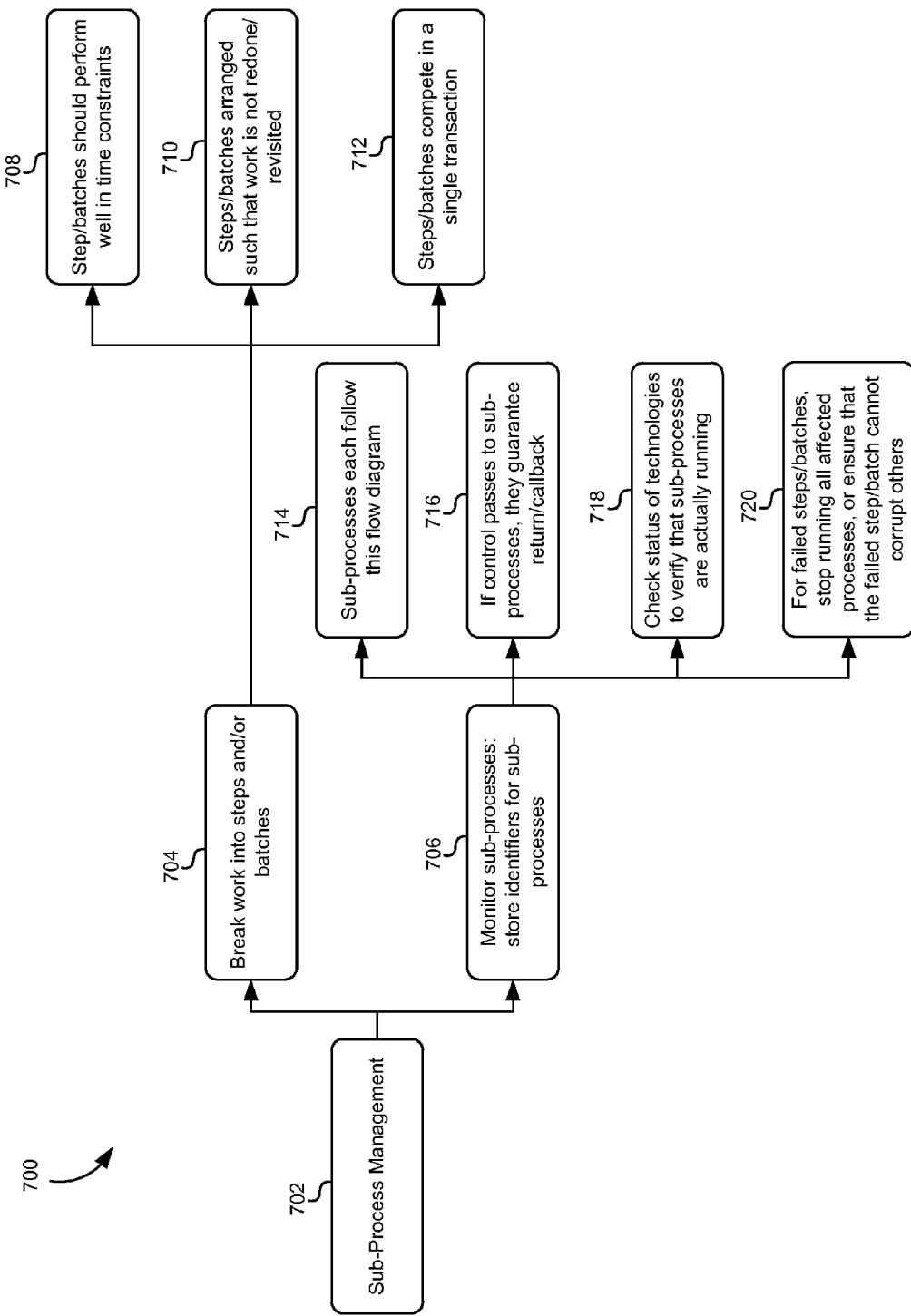
FIG. 7 illustrates a logical flow diagram of recoverability information associated with sub-process management associated with a process, according to one embodiment.
Figure 8:
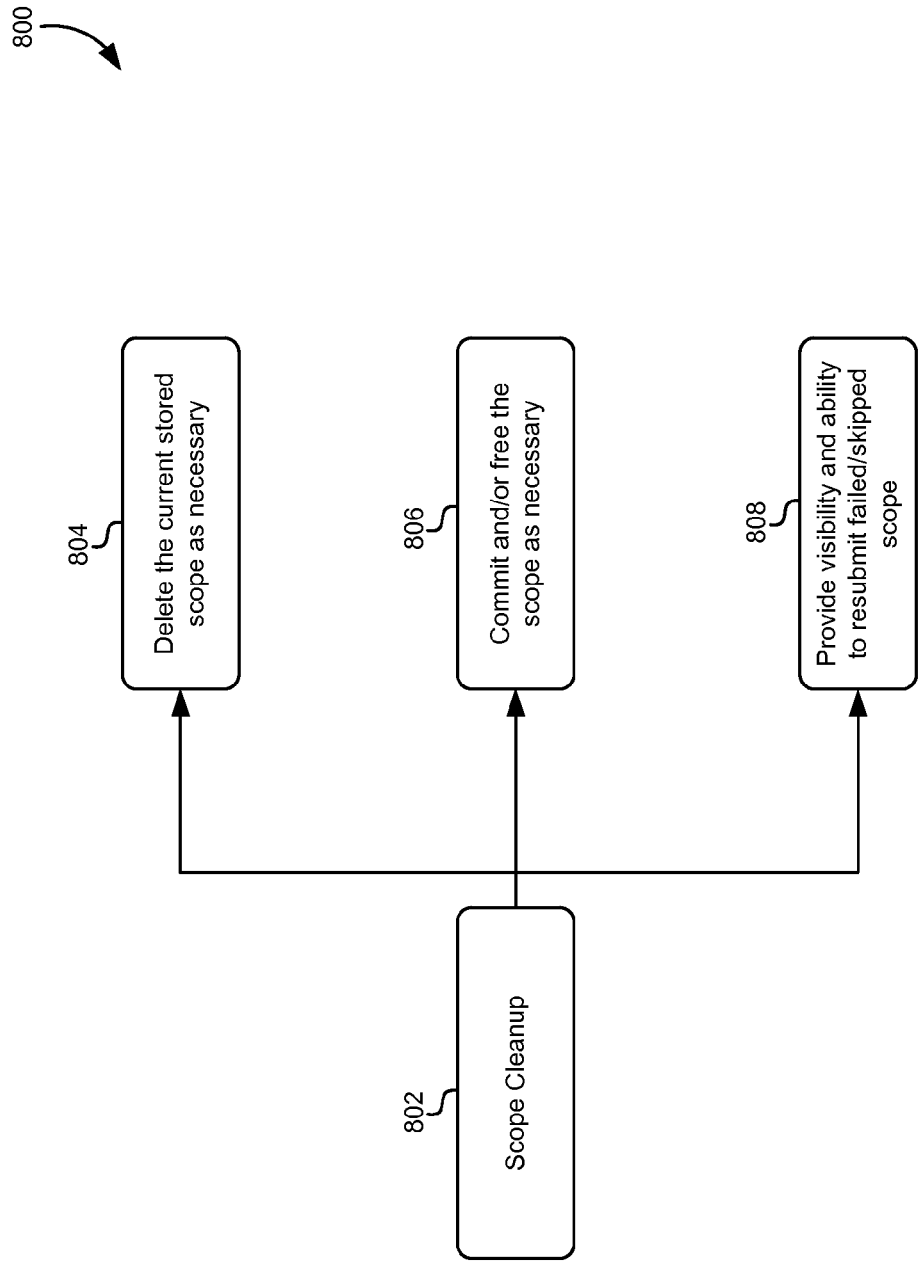
FIG. 8 illustrates a logical flow diagram of recoverability information associated with scope cleanup procedures associated with a process, according to one embodiment.

To further understand these three subtypes of recoverability information 502, FIGS. 6-8 will provide a more detailed explanation of each. While these figures are organized as flowcharts, each element in the flowchart may be associated with a particular query provided to a process designer. These queries may be configured to elicit a response as to how well a particular process meets the requirement represented by the flowchart element. Therefore, for each element in FIGS. 6-8, a query may be designed by one having skill in the art for an interface to elicit a response from a process designer describing how a particular process deals with each subtype of recoverability information. The responses may be stored in a recoverability database, analyzed, and/or provided to assess failures and deployment requirements throughout the process lifecycle.

FIG. 6 illustrates a logical flow diagram 600 of recoverability information associated with mutual exclusivity of data affected by a process, according to one embodiment. Each element related to managing mutual exclusion may be thought of as a recoverability criteria that may be met, not met, or partially met by each process design. Each endpoint in the flow diagram 600 may be associated with at least one piece of information solicited by the interface.

Element 604 may query the process designer about whether an exclusive and/or scope-based lock will be obtained for the process. In many cases, processes will interact with a database, and each process step may involve or drive off of a single row within the database. These processes may then rely on the database-enforced row-based locking protocol in order to guarantee that proper data locks are enforced. Using this type of row-based locking protocol, the process designer may input recoverability information that indicates that the process obtains exclusive scope-based locks. In some embodiments, the process designer may provide a simple affirmative indication when the interface queries as to element 604. In other embodiments, the designer may also provide an explanation as to how the exclusive/scope-based locks are obtained. The information received from the process designer may indicate whether element 604 is met by their design.

In some cases, mutually exclusive scope-based locks may not be obtained for all data affected by the process. Element 606 may define a general category of recoverability information concerned with defining the current scope of processing. This general category may be further refined by element 610 that is concerned specifically with overlapping scope between failed and running processes or processes with locked scopes. Element 612 may query the process designer about whether the stack of technologies has been properly inspected to see if any overlapping processes are actually running in parallel.

As described above, information provided through the interface may influence or affect the type of information solicited subsequently. For example, if a designer indicated that a process used row-based locking, then the information for element 612 may already be filled out. If a process tries to access a lock row, then the database will already secure the scope of processing to a single row (element 606), will automatically check for overlapping processes locking that particular row (element 610), will automatically check the stack of technologies (element 612), and will wait for the process to complete to avoid a deadlock exception (element 614).

In another example, the scope of processing for element 606 may determine that elements A, B, and C, are being operated on by the process. The process designer may then check to see if this scope is shared by any other processes for element 610. For example, the Enterprise Service Scheduler (ESS) available from Oracle® may provide thread scheduling services. In order to answer element 612, the process designer can check the status tables of the ESS to determine whether the process IDs are actually running, for example, in addition to asking ESS itself for the procss status. The process designer may respond by indicating that they are relying on the ESS (or equivalent thread scheduling service) to handle processes with overlapping scope. This may be used to quantify an element of risk that can later be used to determine whether or not a failed process is recoverable.

Element 614 may query the process designer about how issues identified by element 612 are being handled. Preferred methods of handling process scope overlap may be provided as a set of choices from which the process designer may select a choice. For example, one option may be to design the process to wait for the conflicting process to complete before executing. A second option may be to simply resubmit the existing failed process if a scope collision is detected with that process. A third option may be to skip operations that conflict in scope with the other process and move onto other operations. The skipped operations may be returned to later during the process execution, or the user may be notified that the operations have been skipped such that it can be decided what is the best course of action (e.g. the user may determine that the operations do not need to be revisited). For example, when using row-based locking protocols, a single row may be skipped if a lock is not achieved and/or another process is actively attempting to change that database row. A fourth option may be to extricate scope from the existing failed process so that it may become part of the scope of the newly submitted process.

Element 608 may query the process designer as to how quickly processes commit. If the current scope of the process is stored as state, then other processes may be waiting to use the stored scope. The process designer may provide an indication of how quickly the process releases its scope after data has been committed. Because many of the processes in typical usage scenarios will be quite complex, they may involve many transactions. Therefore, the system may need to store state information describing how the process is progressing through individual transactions. Element 608 may be used to ensure that the state is recoverable if the process fails between transactions within a process. For example, if power is lost midway through a process, element 608 may determine whether the process can be restarted where power was lost, or if corrections need to be made and the process needs to be started over. For processes that take many hours to execute, being able to restart where a previous attempt failed may be very advantageous.

FIG. 7 illustrates a logical flow diagram 700 of recoverability information associated with managing sub-processes associated with a process, according to one embodiment. Each element related to sub-process management may be thought of as a recoverability criteria that may be met, not met, or partially met by each individual process design. Each endpoint in the flow diagram 700 may be associated with at least one piece of information solicited by the interface.

Because of the complex nature of most processes, they can be broken up into a number of steps, and each step can be broken up into a number of batches. The inherent complexity any of a process design requires that element 702 may be presented to help manage sub-processes associated with the steps/batches. Element 704 may query the process designer as to whether the process is divided into multiple steps/batches. If an affirmative answer is received, element 708 can query whether the batches of steps are verified to perform within known time constraints. In some embodiments, step/batches may be expected to perform in under one minute. For large jobs, step/batches may be expected perform in between 15 minutes and one hour. In some embodiments, element 708 may be used to ensure that the developer has done time testing on the various steps and batches to ensure that they perform predictably. If the process developer provides an indication that testing has not been completed, this may be used as a red flag during a diagnostic session to show that a process was stuck in a loop or subject to a similar error.

Element 710 may be used to query whether step/batches have been arranged and designed such that the work done by the steps/batches is not redone or revisited by subsequent steps/batches. This information may be essential for determining whether a step or batch can start where it left off in the case of a failure. Therefore, if an affirmative response is gathered by element 710, a process may be able to begin with the next step/batch in the case of a failure.

Element 712 may be used to query whether each step/batch is verified to complete in a single transaction. In some embodiments, element 712 may be a key response in determining whether a failed process can recover where it left off. In one embodiment involving a relational database, each step/batch may be encapsulated within a single database transaction and marked as complete within the database. This may allow a process designer to rely on consistency controls of the database to ensure recoverability and transactional integrity in the case of a failure. This ensures that any calculations lost during a failure have not been committed to a database and may be restarted just subsequent to the last recorded transaction.

Element 706 may be used to query a process designer as to how sub-processes have been monitored and how well each individual sub-process has been analyzed for recoverability itself. In some embodiments, an identifier for each sub-process may be stored by the main process. For example, a stack of technologies or thread scheduler may be queried to request an ID for each sub-process associated with a process.

Element 714 may be used to query whether each sub-process has been verified according to the same mapping as the overall process. In other words, element 714 is inherently recursive in nature. Each sub-process of an overall process is expected to be recoverable. Therefore, element 714 may be used to query whether the process designer has subjected each individual sub-process to the same verification illustrated by FIG. 5 for the overall process.

Element 716 may be used to query whether each sub-process has been verified to return control back to the overall process when it has finished executing. This verifies that sub-processes are not subject to endless loops or endless recursions, and that the control flow of the overall process can be logically mapped and analyzed later after a failure. In some cases, a process developer may respond by supplying a particular technology responsible for executing sub-processes. As with each element, a process designer may also respond in the negative, indicating that return of control is not guaranteed. As with each element, this may be an indication of how a process failed later during diagnostics and when making a determination as to whether the process is guaranteed to be recoverable.

Element 718 can be used to query the process designer as to whether they have verified that each sub-process is actually running according to the stack of technologies in the software system. For example, an ESS may be queried during execution to make sure that the sub-processes are scheduled to run as expected. In some embodiments, the ESS may also store state information in a database. In responding to element 718, a response may be recorded indicating that both the ESS and the state information tables in the database have been checked to verify that each sub-process is running as expected. In some embodiments, element 718 may be used to query whether the process itself is monitoring each sub-process against the expected entries in the stack of technologies. In other words, a response to element 718 should indicate whether the process itself is responsible for making sure that each of its sub-processes runs when they are supposed to.

Element 720 may be used to query whether the process is able to detect its own failures and take appropriate actions. For example, a process developer may indicate whether the process ensures that all affected sub-processes are stopped after a failure is detected. In another example, a process developer may indicate whether steps have been taken to ensure that the process isolates any failed steps/batches to ensure that other steps/batches are not corrupted prior to being stopped. Often times, a developer may provide an indication that all processes are stopped when a failure is detected.

FIG. 8 illustrates a logical flow diagram 800 of recoverability information associated with scope cleanup procedures associated with a process, according to one embodiment. Each element related to scope cleanup procedures may be thought of as a recoverability criteria that may be met, not met, or partially met by each individual process design. Each endpoint in the flow diagram 800 may be associated with at least one piece of information solicited by the interface.

Element 802 may be used to represent a category of queries for recoverability information related to cleanup procedures that not only ensure that a process is recoverable, but that also ensures that resources are properly released. In some embodiments, element 802 may be thought of as a final state in a flow diagram for ensuring that a process is well behaved and recoverable.

Element 804 may be used to query whether the current process properly deletes the current stored scope as necessary. This may be particularly important where a process state is stored during execution. The process designer may provide an indication as to whether the process has been tested to ensure that its scope is properly released. Element 806 may be presented as an alternative to element 804 in some embodiments. If the current process does not store its state, but rather relies on a database's row locking mechanism, the process designer could instead provide an indication in response to element 806 that each transaction properly commits with the database at its conclusion. More complicated examples may include instances where the database row locking mechanism is used along with stored state information, requiring both element 804 and element 806 to elicit a response from the process designer.

Element 808 may be used to query what type of debugging information is provided to a user. Given the described complexity of processes and batches that may be run against a database system, information associated with a failure should be made visible to a user for assessment purposes. The user should also be able to resubmit failed or skipped sub-processes within the scope of the overall process using the debugging information. In many cases, the process designer may provide an indication that a log associated with the process records operational and failure information that can be provided to a user. For example, a log may provide information describing which sub-processes failed, which were resubmitted, which failed sub-processes were responsible for an increase in execution time, and so forth. The log may also provide an indication of which sub-processes were skipped and the effect that the skipped sub-processes may have on the overall process. The process designer provide an indication to the recoverability interface describing the type of debugging information made available to users. Note that some processes may require more visibility and debugging information than others.

Figure 9:
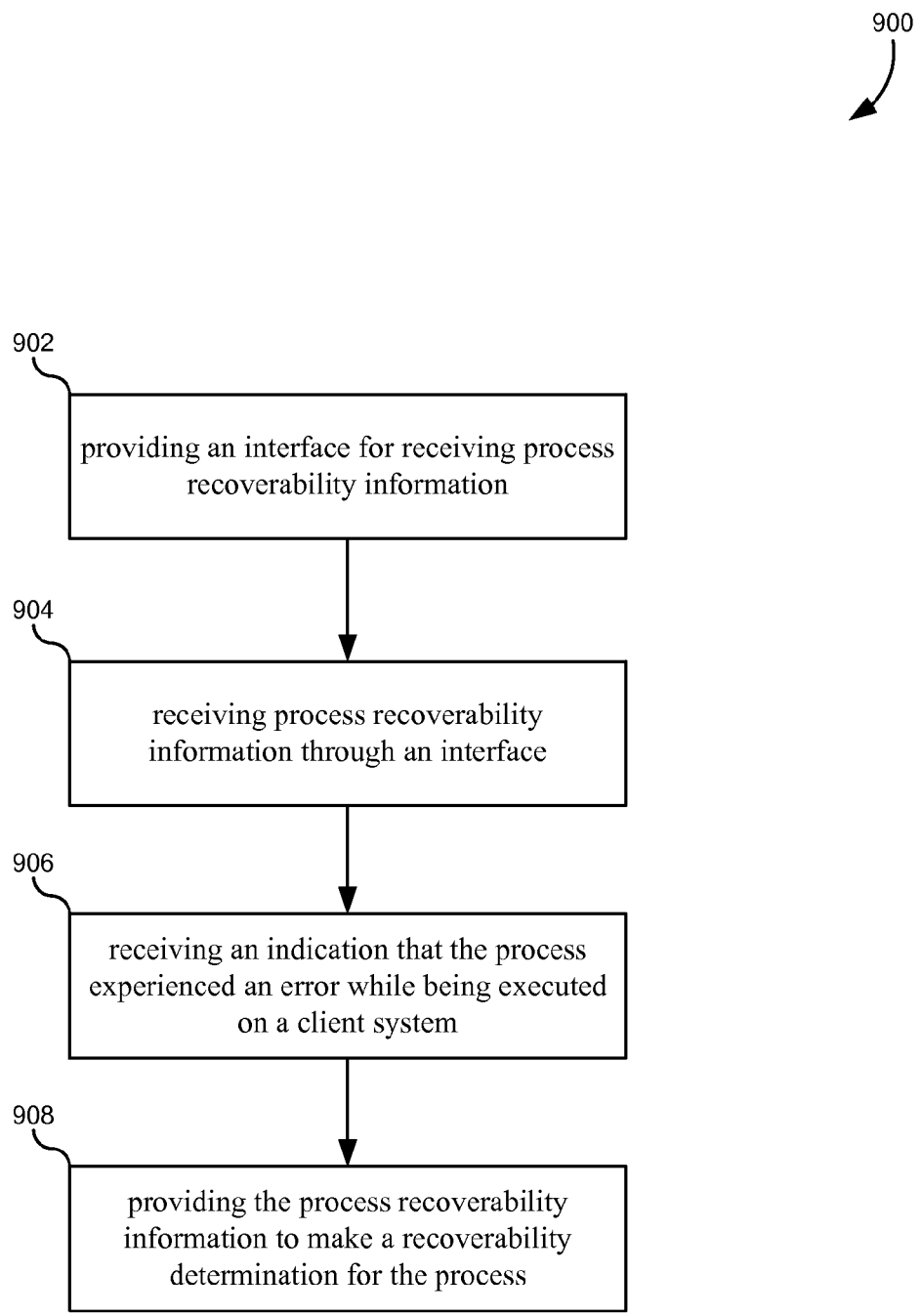
FIG. 9 illustrates a flowchart of a method for recovering batch-based processes, according to some embodiments.

FIG. 9 illustrates a flowchart 900 of a method for recovering and analyzing batch-based processes, according to some embodiments. This method may be used to guarantee the recoverability of a process, to determine how recoverable a process may be, to provide debugging information after a failure, or even to approve a process prior to deployment for use with live data. The information entered into the interface may be used or revisited at any point during the process lifecycle to determine the cause a failure, or to determine whether the process should continue to be used.

The method may include providing an interface for receiving process recoverability information (902). The interface may be presented on a client machine, a mobile device, a workstation, and/or the like. In some embodiments, the interface may be presented on a computing device belonging to a process designer. The interface may be implemented using a spreadsheet, an application, applet, a web form, a mobile app operating on a smart phone, and/or the like. The interface may be presented as a series of questions, or as a series of fields that can be filled out by the process designer. In some embodiments, the recoverability information may be elicited in a sequential order, where previous responses can affect the order and type of information requested in the future.

The recoverability information may include information describing a mutual exclusivity of data affected by the process. The recoverability information may also include information describing sub-processes associated with the process. Additionally, the recoverability information may include information describing scope cleanup procedures associated with the process. Each of these three types of information have been described in detail above in relation to FIGS. 5-8. Each element described in these figures may represent one or more questions or fields that are made available according to the interface.

The method may also include receiving the process recoverability information through the interface (904). The process recoverability information may be received as described above with a process designer entering responses directly to the interface. In some embodiments, fields within the interface may be automatically populated by analyzing the process itself. For example, a database process that utilizes a row locking mechanism may automatically provide interface information for elements related to mutual exclusivity and scope cleanup. Some embodiments may also analyze documentation provided with the process to automatically populate fields in the interface.

The method may additionally include receiving an indication that the process experienced an error while being executed on the client system (906). Between the time when the interface receives the recoverability information and when an error is detected, the process may be deployed for live use in a client system a customer. In some embodiments, the process designer may be associated with the client system. For example, database users may be approved to design their own processes and the recoverability interface may be used internally to a managing organization. In other embodiments, processes may be designed by a database provider, such as Oracle®, and the process may be run on a client system by a database customer. Generally, the organization responsible for designing and deploying the process may also be responsible for acquiring, maintaining, and/or distributing the recoverability information.

The method may further include providing the process recoverability information to make a recoverability determination for the process (908). The recoverability information may be analyzed to determine whether a process is recoverable. For example, an indication may be provided as to whether or not a process can be restarted where it left off before the failure occurred. In some cases, this determination may be provided along with the process itself to a client system. In other cases, a database storing the recoverability information provided through the recoverability interface may provide an indication to a client system at the time of the failure whether or not the process can be restarted and/or covered.

In some embodiments, the recoverability determination may be used in contexts other than process failures. As described above, the recoverability determination may also be used to describe the risk associated with the process. The recoverability determination may also be used to determine whether a process should be deployed in the first place, how widely it should be deployed, and what warnings, if any, should accompany its deployment. The recoverability information may also be used to analyze liability and to recommend preemptive safeguards that may be put in place to prevent data corruption or loss.

It should be appreciated that the specific steps illustrated in FIG. 9 provide particular methods of receiving, analyzing, and/or using recoverability information according to various embodiments. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of recovering batch-based processes, the method comprising:
   receiving process recoverability information for a process before the process is deployed for live use, the recoverability information comprising:
      information describing a mutual exclusivity of data affected by the process;
      information describing sub-processes associated with the process; and
      information describing scope cleanup procedures associated with the process;
   deploying the process for live use on a plurality of client systems;
   receiving an indication that the process experienced an error while being executed on a client system in the plurality of client systems;
   in response to receiving the indication that the process experienced the error, retrieving the process recoverability information for the process;

determining that the process can be restarted based on the recoverability information for the process; and transmitting, to the client system, an indication that the process can be restarted where the process left off prior to experiencing the error.

2. The method of claim 1 further comprising determining whether the process should be deployed for live use based at least in part on a recoverability determination.

3. The method of claim 1 further comprising providing an interface for receiving the recoverability information, wherein the interface comprises a plurality of fields to be populated by process designer.

4. The method of claim 1 further comprising determining that the process should be removed from live use based on the recoverability determination.

5. The method of claim 1 wherein the information describing the mutual exclusivity of the data affected by the process comprises:
 information associated with exclusive and/or scope-based locks;
 information associated with determining a current scope of processing; and
 information associated with storing the current scope of processing as a state.

6. The method of claim 1 wherein the information describing sub-processes associated with the process comprises:
 information associated with a recoverability of each sub-process; and
 information associated with a performance of each sub-process.

7. The method of claim 1 wherein the information describing scope cleanup procedures associated with the process comprises:
 information associated with deleting a current stored scope or committing a current scope; and
 information associated with debug information provided to the client system.

8. A computer-readable memory comprising a sequence of instructions which, when executed by one or more processors, causes the one or more processors to recover batch-based processes by:
 receiving process recoverability information for a process before the process is deployed for live use, the recoverability information comprising:
  information describing a mutual exclusivity of data affected by the process;
  information describing sub-processes associated with the process; and
  information describing scope cleanup procedures associated with the process;
 deploying the process for live use on a plurality of client systems;
 receiving an indication that the process experienced an error while being executed on a client system in the plurality of client systems;
 in response to receiving the indication that the process experienced the error, retrieving the process recoverability information for the process;
 determining that the process can be restarted based on the recoverability information for the process; and
 transmitting, to the client system, an indication that the process can be restarted where the process left off prior to experiencing the error.

9. The computer-readable memory according to claim 8 wherein the instructions further cause the one or more processors to recover batch-based processes by determining whether the process should be deployed for live use based at least in part on a recoverability determination.

10. The computer-readable memory according to claim 8 wherein the information describing the mutual exclusivity of the data affected by the process comprises:
 information associated with exclusive and/or scope-based locks;
 information associated with determining a current scope of processing; and
 information associated with storing the current scope of processing as a state.

11. The computer-readable memory according to claim 8 wherein the information describing sub-processes associated with the process comprises:
 information associated with a recoverability of each sub-process; and
 information associated with a performance of each sub-process.

12. The computer-readable memory according to claim 8 wherein the information describing scope cleanup procedures associated with the process comprises:
 information associated with deleting a current stored scope or committing a current scope; and
 information associated with debug information provided to the client system.

13. A system comprising:
 one or more processors; and
 a memory communicatively coupled with and readable by the one or more processors and comprising a sequence of instructions which, when executed by the one or more processors, cause the one or more processors to recover batch-based processes by:
  receiving process recoverability information for a process before the process is deployed for live use, the recoverability information comprising:
   information describing a mutual exclusivity of data affected by the process;
   information describing sub-processes associated with the process; and
   information describing scope cleanup procedures associated with the process;
  deploying the process for live use on a plurality of client systems;
  receiving an indication that the process experienced an error while being executed on a client system in the plurality of client systems;
  in response to receiving the indication that the process experienced the error, retrieving the process recoverability information for the process;
  determining that the process can be restarted based on the recoverability information for the process; and
  transmitting, to the client system, an indication that the process can be restarted where the process left off prior to experiencing the error.

14. The system of claim 13 wherein the instructions further cause the one or more processors to recover batch-based processes by determining whether the process should be deployed for live use based at least in part on a recoverability determination.

15. The system of claim 13 wherein the information describing the mutual exclusivity of the data affected by the process comprises:
 information associated with exclusive and/or scope-based locks;
 information associated with determining a current scope of processing; and information associated with storing the current scope of processing as a state.

16. The system of claim 13 wherein the information describing sub-processes associated with the process comprises:
   information associated with a recoverability of each sub-process; and
   information associated with a performance of each sub-process.

17. The system of claim 13 wherein the information describing scope cleanup procedures associated with the process comprises:
   information associated with deleting a current stored scope or committing a current scope; and
   information associated with debug information provided to the client system.

* * * * *